J. FITZGERALD.
Grinding Mill.
No. 4,755.
Patented Sept. 12, 1846.
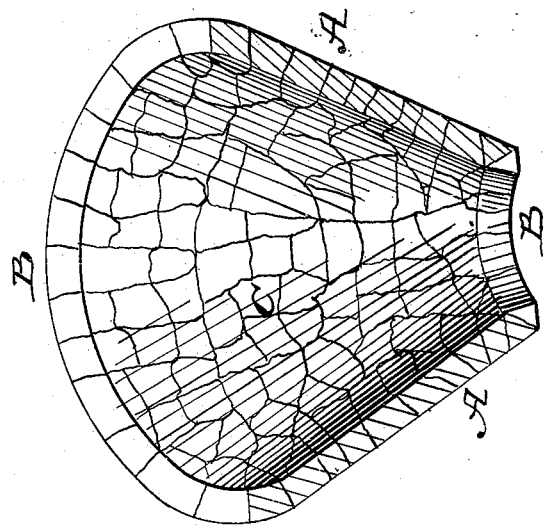
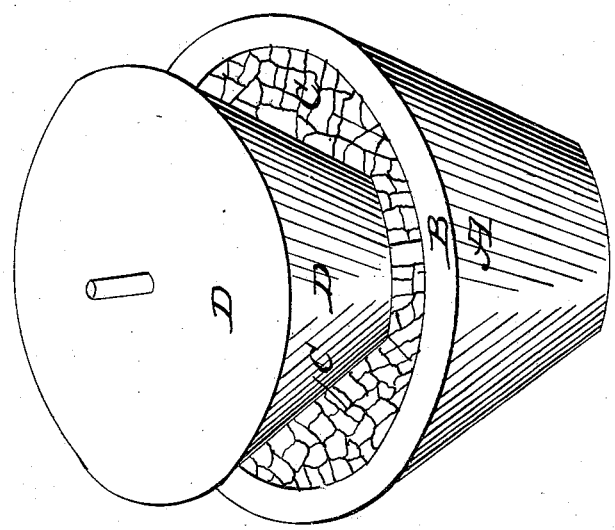

UNITED STATES PATENT OFFICE.

JESSE FITZGERALD, OF NEW YORK, N. Y.

ARTIFICIAL STONE FOR GRINDING.

Specification of Letters Patent No. 4,755, dated September 12, 1846.

*To all whom it may concern:*

Be it known that I, JESSE FITZGERALD, of the city, county, and State of New York, have invented a new and Improved Mode of Forming Grinding-Surfaces in Mills; and I do hereby declare that the following is a full and exact description of the construction of the same, reference being had to the annexed drawings, making a part of this specification, in which—

Figure 1 is a perspective view, and Fig. 2 is a transverse section, letter A representing the external frame; B, the rim of the frame, which keeps the pieces of stone from working out. C, the pieces of stone; D, the solid cone which revolves within the female cone.

To enable others to make and use my invention, I proceed to describe its construction in detail.

I take small pieces of bur stone, or of a similar material, pieces so small that they would otherwise be thrown away as useless, and, selecting such as are of nearly uniform thickness, I set them in cement in an external conical frame (made generally of cast iron) having an inner rim (see B) which keeps the stones in their place. By this means a compact grinding surface is formed, of the shape of a female cone, in which a solid cone of bur stone revolves. These small pieces are held firmly in their place on the principle of the arch, as well as by the confinement of the external frame, so that they may thus be used until they are nearly worn away with use.

The utility of my invention consists in making the mill smaller, more portable, and far less expensive. To form a female cone from blocks of bur stone as heretofore used requires that the cone be made much larger, and also that the concavity be formed by hollowing out the blocks with a chisel. A small block is so liable to break under the act of chiseling that the desired concavity could seldom be obtained. Moreover the labor of hollowing out solid blocks of bur stone, is so great, that the expense of a mill so made would render it completely unsaleable. In the year 1830, my brother obtained a patent for a portable bur stone mill of a similar construction—that is to say, of a cone revolving within a cone. This patent he was afterward obliged to abandon from the great difficulty and expense of hollowing out the female cone. I was thus led to study out the present invention for remedying that evil. By using small pieces of stone, I get my material without cost, for these pieces would otherwise be thrown away. Moreover these small pieces, being set in an external conical frame, form of themselves the desired concavity without any labor or expense of hollowing out by the chisel. Thus I am enabled to make a small and cheap mill.

Now what I claim as my invention, and wish to secure by Letters Patent, is—

The use of French bur stone, or of a similar material, not in blocks, but in small pieces heretofore considered useless, and setting these pieces in an external frame of the shape of a cone or cylinder, so as to form a grinding surface that will cost far less than a similar surface formed in any other way hitherto employed.

JESSE FITZGERALD.

In presence of—
LEWIS C. GUNN,
D. F. CURRY.